US012645477B2

(12) United States Patent
Luo et al.

(10) Patent No.: US 12,645,477 B2
(45) Date of Patent: Jun. 2, 2026

(54) CROSS-CLUSTER SERVICE RESOURCE DISCOVERY

(71) Applicant: VMware, Inc., Palo Alto, CA (US)

(72) Inventors: Lan Luo, Beijing (CN); Wenfeng Liu, Beijing (CN); Donghai Han, Beijing (CN); Jianjun Shen, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 761 days.

(21) Appl. No.: 17/815,609

(22) Filed: Jul. 28, 2022

(65) Prior Publication Data

US 2024/0012664 A1 Jan. 11, 2024

(30) Foreign Application Priority Data

Jul. 7, 2022 (WO) ................ PCT/CN2022/104419

(51) Int. Cl.
*G06F 9/455* (2018.01)

(52) U.S. Cl.
CPC ................... *G06F 9/45558* (2013.01); *G06F 2009/45595* (2013.01)

(58) Field of Classification Search
CPC ................................................. G06F 9/45558
USPC .......................................................... 718/1
See application file for complete search history.

(56) References Cited

U.S. PATENT DOCUMENTS 7,340,578 B1 * 3/2008 Khanzode ............... G06F 3/067
718/170
10,270,707 B1 * 4/2019 Florissi .................. G16B 30/10

10,659,523 B1 * 5/2020 Joseph .................... H04L 67/10
11,481,243 B1 * 10/2022 Wang ...................... G06F 9/547
2008/0086501 A1 * 4/2008 Levine .................. G06F 16/284
2008/0134182 A1 * 6/2008 Somogyi ................ G06F 17/00
718/100
2012/0233463 A1 * 9/2012 Holt ...................... G06F 3/0631
713/168
2014/0082285 A1 * 3/2014 Ewing ................. G06F 12/0866
711/119
2015/0200802 A1 * 7/2015 Sawal ................. H04L 41/0668
370/228
2016/0292608 A1 * 10/2016 Yin .................. G06Q 10/06315

(Continued)

OTHER PUBLICATIONS https://www.infoq.com/articles/kubernetes-trends-and-challenges/
<https://protect-us.mimecast.com/s/IqYbCgJDVGFAkwrJhN2NzR?
domain=infoq.com>.

(Continued)

*Primary Examiner* — Mehran Kamran
(74) *Attorney, Agent, or Firm* — King Intellectual Asset Management

(57) ABSTRACT

The disclosure provides an approach for cross-cluster service resource discovery. A method includes obtaining, at a common store in a first node cluster in a cluster set information about a service resource of a second node cluster. The method includes creating a multi-cluster object associated with the service resource, wherein the multi-cluster object provides an association between the service resource and one or more endpoints on the second node cluster. The method includes storing the multi-cluster object in the common store, wherein the multi-cluster object is accessible in the common store by any of the plurality of node clusters in the cluster set to access the service resource on any of the one or more endpoints on the second node cluster.

20 Claims, 6 Drawing Sheets

(56) References Cited

U.S. PATENT DOCUMENTS

| | | | | |
|---|---|---|---|---|
| 2019/0007482 | A1* | 1/2019 | Castaing | G06F 11/3055 |
| 2020/0042364 | A1* | 2/2020 | Kumar Shimoga Manjunatha | G06F 9/5077 |
| 2020/0344322 | A1* | 10/2020 | Zhu | H04L 47/821 |
| 2021/0037087 | A1* | 2/2021 | Liu | G06F 11/3006 |
| 2021/0232440 | A1* | 7/2021 | Ranjan | G06F 9/5005 |
| 2021/0342193 | A1* | 11/2021 | Anand | G06F 9/5077 |
| 2022/0075653 | A1* | 3/2022 | Liu | G06F 9/4881 |
| 2022/0083375 | A1* | 3/2022 | Zeng | G06F 9/4881 |
| 2022/0156102 | A1* | 5/2022 | Bandarupalli | G06F 9/5077 |
| 2022/0156115 | A1* | 5/2022 | Zeng | G06F 9/505 |
| 2022/0188172 | A1* | 6/2022 | Gupta | G06F 9/5044 |
| 2022/0237017 | A1* | 7/2022 | Kim | G06F 9/5077 |
| 2022/0391244 | A1* | 12/2022 | Gustafsson | H04L 47/82 |
| 2023/0012487 | A1* | 1/2023 | Makaya | G06F 9/5027 |
| 2023/0072358 | A1* | 3/2023 | Baillargeon | G06F 9/5088 |
| 2023/0273825 | A1* | 8/2023 | He | G06F 9/5072 |
| 2023/0342191 | A1* | 10/2023 | Wu | G06F 9/546 |
| 2023/0362236 | A1* | 11/2023 | Nair | H04L 67/1001 |
| 2024/0012664 | A1* | 1/2024 | Luo | H04L 41/0893 |

OTHER PUBLICATIONS https://github.com/kubernetes-sigs/kubefed <https://protect-us.mimecast.com/s/R31cCjRgVkhn9G20iRG0Cm?domain=github.com>.
<https://github.com/kubernetes/enhancements/tree/master/keps/sig-multicluster/1645-multi-cluster-services-api#goals>.
www.antrea.io <https://protect-us.mimecast.com/s/ObjOCIYkVmc27PyllqVgYq?domain=antrea.io>.

* cited by examiner

100

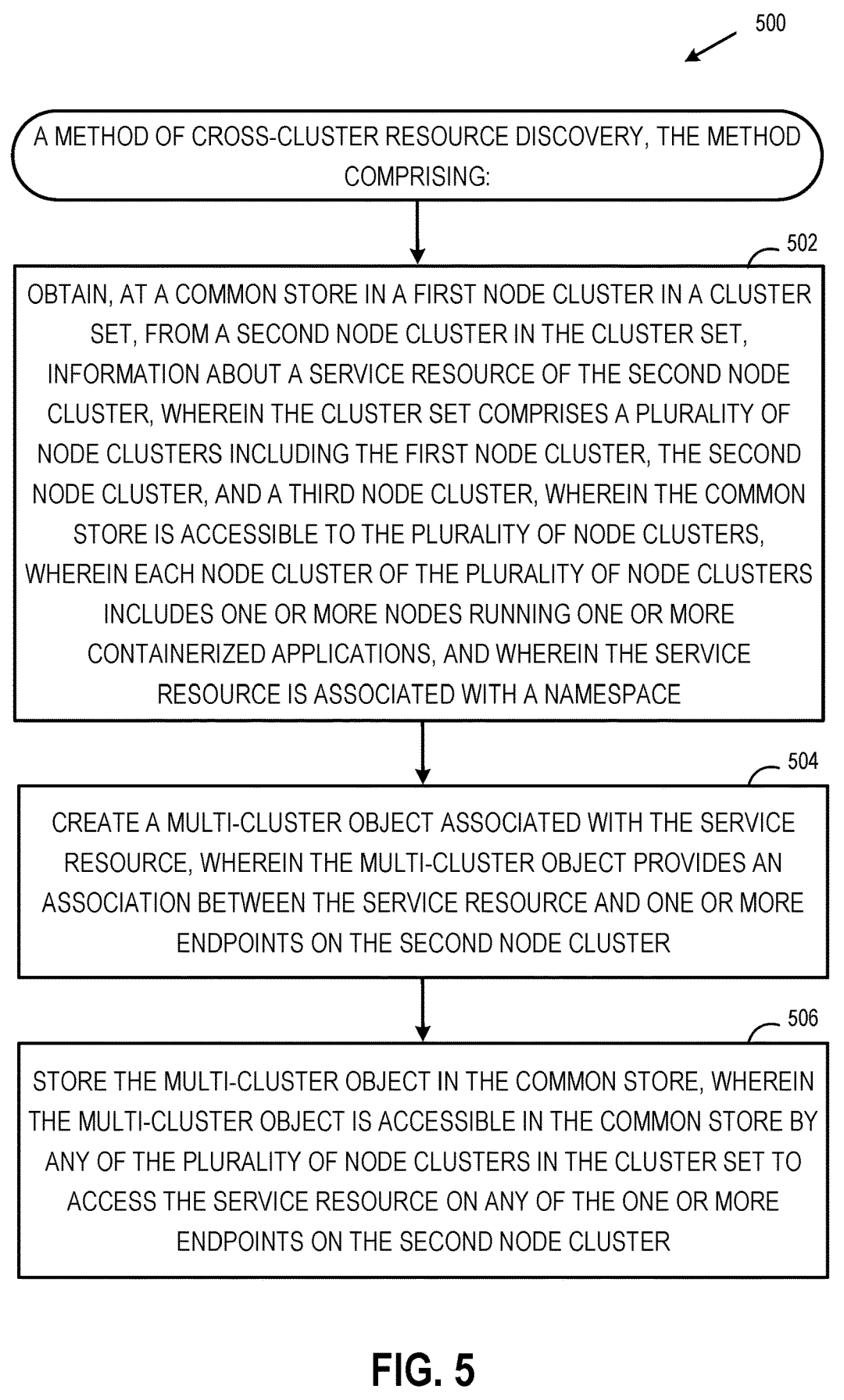

500

A METHOD OF CROSS-CLUSTER RESOURCE DISCOVERY, THE METHOD COMPRISING:

502

OBTAIN, AT A COMMON STORE IN A FIRST NODE CLUSTER IN A CLUSTER SET, FROM A SECOND NODE CLUSTER IN THE CLUSTER SET, INFORMATION ABOUT A SERVICE RESOURCE OF THE SECOND NODE CLUSTER, WHEREIN THE CLUSTER SET COMPRISES A PLURALITY OF NODE CLUSTERS INCLUDING THE FIRST NODE CLUSTER, THE SECOND NODE CLUSTER, AND A THIRD NODE CLUSTER, WHEREIN THE COMMON STORE IS ACCESSIBLE TO THE PLURALITY OF NODE CLUSTERS, WHEREIN EACH NODE CLUSTER OF THE PLURALITY OF NODE CLUSTERS INCLUDES ONE OR MORE NODES RUNNING ONE OR MORE CONTAINERIZED APPLICATIONS, AND WHEREIN THE SERVICE RESOURCE IS ASSOCIATED WITH A NAMESPACE

504

CREATE A MULTI-CLUSTER OBJECT ASSOCIATED WITH THE SERVICE RESOURCE, WHEREIN THE MULTI-CLUSTER OBJECT PROVIDES AN ASSOCIATION BETWEEN THE SERVICE RESOURCE AND ONE OR MORE ENDPOINTS ON THE SECOND NODE CLUSTER

506

STORE THE MULTI-CLUSTER OBJECT IN THE COMMON STORE, WHEREIN THE MULTI-CLUSTER OBJECT IS ACCESSIBLE IN THE COMMON STORE BY ANY OF THE PLURALITY OF NODE CLUSTERS IN THE CLUSTER SET TO ACCESS THE SERVICE RESOURCE ON ANY OF THE ONE OR MORE ENDPOINTS ON THE SECOND NODE CLUSTER

FIG. 5

CROSS-CLUSTER SERVICE RESOURCE DISCOVERY

RELATED APPLICATIONS

This application claims benefit of and priority to International Patent Cooperation Treaty Application No. PCT/CN2022/104419, filed Jul. 7, 2022, which is herein incorporated in its entirety by reference for all purposes.

BACKGROUND

Computer virtualization is a technique that involves encapsulating a physical computing machine platform into virtual machine(s) (VM(s)) executing under control of virtualization software on a hardware computing platform or "host." A VM provides virtual hardware abstractions for processor, memory, storage, and the like to a guest operating system (OS). The virtualization software, also referred to as a "hypervisor," may include one or more virtual machine monitors (VMMs) to provide execution environments) for the VM(s).

Software defined networking (SDN) involves a plurality of physical hosts in communication over a physical network infrastructure of a data center (e.g., an on-premise data center or a cloud data center). The physical network to which the plurality of physical hosts are connected may be referred to as an underlay network. Each host has one or more virtualized endpoints such as VMs, containers, Docker containers, data compute nodes, isolated user space instances, namespace containers, or other virtual computing instances (VCIs). The VMs running on the hosts may communicate with each other using an overlay network established by hosts using a tunneling protocol. Though certain aspects are discussed herein with respect to VMs, it should be noted that the techniques may apply to other suitable VCIs as well.

Applications today are deployed onto a combination of VMs, containers, application services, and more. A container is an abstraction of an application's source code together with the application's libraries, dependencies, and settings. For deploying such applications, a container orchestrator (CO) provides a platform for automating deployment, scaling, and operations of application containers across clusters of hosts. One container orchestrator is known as Kubernetes®. Kubernetes offers flexibility in application development and offers several useful tools for scaling.

In a Kubernetes system, containers are grouped into logical unit called "pods" that execute on nodes in a cluster (also referred to as "node cluster"). A node can be a physical server or a VM. In a typical deployment, a node includes an OS, such as Linux®, and a container engine executing on top of the OS that supports the containers of the pod. Containers in the same pod share the same resources, such as memory resources, processor resources, etc., and the same network, and the containers in the same pod maintain a degree of isolation from containers in other pods. The pods are distributed across nodes of the cluster.

Kubernetes defines different built-in objects, like services and endpoints, in a single cluster. In Kubernetes, a service resource is an abstraction that defines a logical set of pods and a policy by which to access them (e.g., a micro-service). A service is defined using YAML or JSON, like all Kubernetes objects. The set of pods targeted by a service are referred to as the service endpoint. An endpoint may correspond to a pod VM running an application supporting the service. In Kubernetes, each pod VM has a unique IP address and a set of pod VMs may share a domain name system (DNS) name. A user can leverage Kubernetes clusters to run modern micro-service-based applications. Kubernetes also provides fine-grained access control via a network policy. Services in Kubernetes include ClusterIP, NodePort, LoadBalancer, and External Name. ClusterIP service assigns a cluster-internal IP address to ClusterIP service, making the service only reachable within the cluster, NodePort service adds a cluster-wide port on top of ClusterIP to enable external connectivity. LoadBalancer service exposes a cloud provider load balancer to the ClusterIP and NodePort service. ExternalName service map a service to a DNS name.

Besides built-in objects, Kubernetes also provides custom resource definition (CRD). CRD allows the user to run any customized resource inside a cluster. A resource in Kubernetes is an endpoint that stores a collection of objects of a certain kind. Objects in Kubernetes includes Pods, Namespaces, ConfigMaps, and Events. The objects can be manipulated using the Kubernetes application programming interface (API). A custom resource provides customized Kubernetes functions not available at Kubernetes installation. The customized resources can be based on different customer business requirements. However, a single cluster may not satisfy complicated applications. Accordingly, many cloud providers operate multiple Kubernetes clusters in multiple regions or multiple availability zones and run the replicas of the same applications in each cluster.

Some users (e.g., individuals, organizations, or teams) build clusters for different categories of applications. A built-in object (e.g., service or endpoint) may be only accessible by an application that is in the cluster. In a multi-cluster environment, there is no efficient way to discover what objects and/or what CRD are in another cluster. Accordingly, when there are multiple clusters, applications in different clusters may not be able to access the object in another cluster. Further, there is no efficient way to control the service access in different clusters for ingress and egress.

In some cases, a full mesh architecture is used to enable multi-cluster network communication. With a full mesh architecture, all member clusters need to maintain all other member clusters access information (e.g., the cluster's resources and policies), which is redundant and vulnerable to security breaches. Further, the full mesh architecture does not support multi-cluster environment in hybrid cloud, is unable to support any rack-awareness service discovery, and is unable to propagate network policies. In some cases, a gateway is used to enable multi-cluster network communication. With a gateway, communication is limited to a service and pod connection, there is no generic resource exchange mechanism to share different kinds of resources in the multi-cluster environment.

Accordingly, techniques are needed for discovery across multiple Kubernetes clusters.

It should be noted that the information included in the Background section herein is simply meant to provide a reference for the discussion of certain embodiments in the Detailed Description. None of the information included in this Background should be considered as an admission of prior art.

SUMMARY

The technology described herein provides a method for cross-cluster resource discovery. The method generally includes obtaining, at a common store in a first node cluster in a cluster set, from a second node cluster in the cluster set, information about a service resource of the second node cluster. The cluster set comprises a plurality of node clusters including the first node cluster, the second node cluster, and a third node cluster. The common store is accessible to the plurality of node clusters. Each node cluster of the plurality of node clusters includes one or more nodes running one or more containerized applications. The service resource is associated with a namespace. The method includes creating a multi-cluster object associated with the service resource, wherein the multi-cluster object provides an association between the service resource and one or more endpoints on the second node cluster. The method includes storing the multi-cluster object in the common store, wherein the multi-cluster object is accessible in the common store by any of the plurality of node clusters in the cluster set to access the service resource on any of the one or more endpoints on the second node cluster.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

FIG. 5 depicts a flow diagram illustrating example operations for cross-cluster resource discovery and sharing, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for resource discovery across multiple clusters. In certain embodiments, the resources are built-in objects, such as services, endpoints, network policy, a configuration map, a deployment map, or other resources. In certain aspects, the clusters are clusters of nodes (e.g., VMs or physical severs) that host containerized applications. The clusters may be managed by a container orchestrator (e.g., Kubernetes). Though certain aspects are described with respect to Kubernetes clusters, it should be noted that the techniques herein are also applicable to other suitable clusters or similar platforms.

In certain embodiments, the clusters are grouped into cluster sets. As used herein, a "cluster set" refers to a group of clusters. A leader cluster is configured for each cluster set. The leader cluster may manage the other clusters in the cluster set.

In certain embodiments, each member cluster of the cluster set is configured to export information about the member's clusters resources and associated endpoints to the leader cluster. The member cluster may write the information about the resources and associated endpoints to a common store at the leader cluster.

In certain embodiments, the leader cluster is configured to monitor the common store for the information about the exported resources, and the associated endpoints, from the member clusters. The leader cluster can form multi-cluster objects for resources in the same namespace exported from multiple cluster members. The multi-cluster cluster object comprises resources, in a same namespace, exported from multiple member clusters, that are reorganized as a single multi-cluster object associated with all of the endpoints associated from the multiple member clusters. The leader cluster writes information about the multi-cluster object and the associated endpoints to the common store.

In certain embodiments, the cluster members monitor the common store for the information about the multi-cluster objects. The clusters members may import information about the multi-cluster objects and the associated endpoints and create a local copy.

In certain embodiments, the cluster members may have information about the rack location of the endpoints. When an application wishes to use a multi-cluster object, an endpoint on a rack located at the same place, or near, the rack running the application can be selected for the multi-cluster object.

In certain embodiments, an administrator may configure a network policy at a member cluster or cluster leader. The network policy can be enforced at the other member cluster (s) of the cluster set by exporting the network policy to the common store and importing the network policy by the other members cluster(s).

Figure 1:
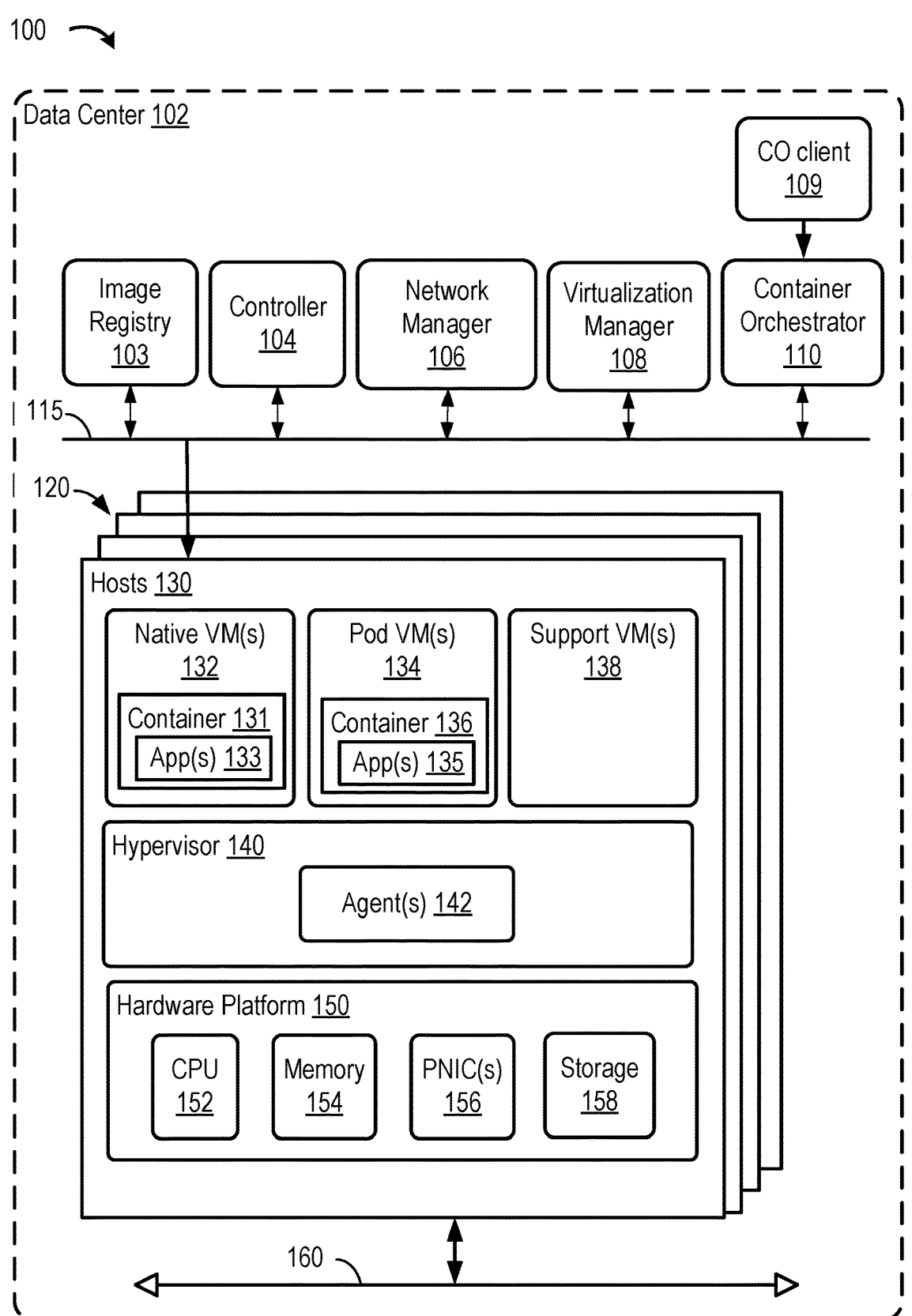
FIG. 1 depicts a block diagram of a data center, according to one or more embodiments.

FIG. 1 depicts example physical and virtual network components in a networking environment 100 in which embodiments of the present disclosure may be implemented.

Networking environment 100 includes a data center 102. Data center 102 includes one or more hosts 130, a management network 115, a data network 160, a controller 104, a network manager 106, a virtualization manager 108, and a container orchestrator (CO) 110. Data network 160 and management network 115 may be implemented as separate physical networks or as separate virtual local area networks (VLANs) on the same physical network.

Data center 102 includes one or more clusters of hosts 130. Hosts 130 may be communicatively connected to data network 160 and management network 115. Data network 160 and management network 115 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 130 may be geographically co-located servers on the same rack or on different racks in any arbitrary location in the data center. Host(s) 130 are configured to provide a virtualization layer, also referred to as a hypervisor 140, that abstracts processor, memory, storage, and networking resources of a hardware platform 150 into multiple VMs (e.g., native VMs 132, pod VMs 134, and support VMs 138).

Host(s) 130 may be constructed on a server grade hardware platform 150, such as an x86 architecture platform. Hardware platform 150 of a host 130 may include components of a computing device such as one or more processors (CPUs) 152, memory 154, one or more network interfaces (e.g., PNICs 156), storage 158, and other components (not shown). A CPU 152 is configured to execute instructions, for example, executable instructions that perform one or more operations described herein and that may be stored in memory 154 and storage 158. PNICs 156 enable host 130 to communicate with other devices via a physical network, such as management network 115 and data network 160. In some embodiments, hosts 130 access a shared storage using PNICs 156. In another embodiment, each host 130 contains a host bus adapter (HBA) through which input/output opera- tions (IOs) are sent to the shared storage (e.g., over a fibre channel (EC) network). A shared storage may include one or more storage arrays, such as a storage area network (SAN), network attached storage (NAS), or the like. The shared storage may comprise magnetic disks, solid-state disks, flash memory, and the like as well as combinations thereof. In some embodiments, the storage 158 (e.g., hard disk drives, solid-state drives, etc.) of host 130 can be aggregated and provisioned as part of a virtual SAN, which is another form of shared storage.

Hypervisor 140 architecture may vary. Virtualization soft- ware can be installed as system level software directly on the server hardware (often referred to as "bare metal" installa- tion) and be conceptually interposed between the physical hardware and the guest operating systems executing in the virtual machines. Alternatively, the virtualization software may conceptually run "on top of" a conventional host operating system in the server. In some implementations, hypervisor 140 may comprise system level software as well as a "Domain 0" or "Root Partition" VM (not shown) which is a privileged machine that has access to the physical hardware resources of the host 130. In this implementation, one or more of a virtual switch, virtual router, virtual tunnel endpoint (VTEP), etc., along with hardware drivers, may reside in the privileged VM. One example of hypervisor 140 that may be configured and used in embodiments described herein is a VMware ESXI™ hypervisor provided as part of the VMware vSphere® solution made commercially avail- able by VMware, Inc. of Palo Alto, CA.

Data center 102 includes a management plane and a control plane. The management plane and control plane each may be implemented as single entities (e.g., applications running on a physical or virtual compute instance), or as distributed or clustered applications or components. In alter- native embodiments, a combined manager/controller appli- cation, server cluster, or distributed application, may imple- ment both management and control functions. In the embodiment shown, network manager 106 at least in part implements the management plane and controller 104 at least in part implements the control plane The control plane determines the logical overlay network topology and maintains information about network entities such as logical switches, logical routers, and endpoints, etc. The logical topology information is translated by the control plane into network configuration data that is then commu- nicated to network elements of host(s) 130. Controller 104 generally represents a control plane that manages configu- ration of VMs within data center 102. Controller 104 may be one of multiple controllers executing on various hosts 130 in data center 102 that together implement the functions of the control plane in a distributed manner. Controller 104 may be a computer program that resides and executes in a server in data center 102, external to data center 102 (e.g., such as in a public cloud) or, alternatively, controller 104 may run as a virtual appliance (e.g., a VM) in one of hosts 130. Although shown as a single unit, it should be understood that controller 104 may be implemented as a distributed or clustered system. That is, controller 104 may include mul- tiple servers or virtual computing instances that implement controller functions. It is also possible for controller 104 and network manager 106 to be combined into a single control- ler/manager. Controller 104 collects and distributes infor- mation about the network from and to endpoints in the network. Controller 104 is associated with one or more virtual and/or physical CPUs (not shown). Processor(s) resources allotted or assigned to controller 104 may be unique to controller 104, or may be shared with other components of data center 102. Controller 104 communi- cates with hosts 130 via management network 115, such as through control plane protocols. In some embodiments, controller 104 implements a central control plane (CCP).

Network manager 106 and virtualization manager 108 generally represent components of a management plane comprising one or more computing devices responsible for receiving logical network configuration inputs, such as from a user or network administrator, defining one or more endpoints (e.g., VCIs) and the connections between the endpoints, as well as rules governing communications between various endpoints.

In some embodiments, virtualization manager 108 is a computer program that executes in a server in data center 102 (e.g., the same or a different server than the server on which network manager 106 executes), or alternatively, virtualization manager 108 runs in one of the VMs. Virtu- alization manager 108 is configured to carry out adminis- trative tasks for data center 102, including managing hosts 130, managing VMs running within each host 130, provi- sioning VMs, transferring VMs from one host 130 to another host, transferring VMs between data centers, transferring application instances between VMs or between hosts 130, and load balancing among hosts 130 within data center 102. Virtualization manager 108 takes commands as to creation, migration, and deletion decisions of VMs and application instances on data center 102. However, virtualization man- ager 108 also makes independent decisions on management of local VMs and application instances, such as placement of VMs and application instances between hosts 130. In some embodiments, virtualization manager 108 also includes a migration component that performs migration of VMs between hosts 130, such as by live migration.

In some embodiments, network manager 106 is a com- puter program that executes in a server in networking environment 100, or alternatively, network manager 106 may run in a VM, e.g., in one of hosts 130. Network manager 106 communicates with host(s) 130 via manage- ment network 115. Network manager 106 may receive network configuration input from a user or an administrator and generates desired state data that specifies how a logical network should be implemented in the physical infrastruc- ture of data center 102. Network manager 106 is configured to receive inputs from an administrator or other entity, e.g., via a web interface or application programming interface (API), and carry out administrative tasks for data center 102, including centralized network management and providing an aggregated system view for a user. One example of network manager 106 that can be configured and used in embodiments described herein as network manager 106 is a VMware NSX® platform made commercially available by VMware, Inc. of Palo Alto, CA.

Data center 102 includes container orchestrator 110. In some examples, container orchestrator 110 is a Kubernetes container orchestrator. In embodiments, the virtualization layer of a host cluster 120 is integrated with an orchestration control plane, such as a Kubernetes control plane. Virtualization manager 108 may deploy container orchestrator 110. In embodiments, the Kubernetes control plane of the supervisor cluster is extended to support custom objects in addition to pods, such VM objects that are implemented using native VMs 132 (as opposed to pod VMs 134. The orchestration control plane includes master server(s) with both pod VM controllers and native VM controllers. The pod VM controllers manage the lifecycles of pod VW. The native VM controllers manage the lifecycles of native VMs executing in parallel to the pod VMs.

Figure 1A:
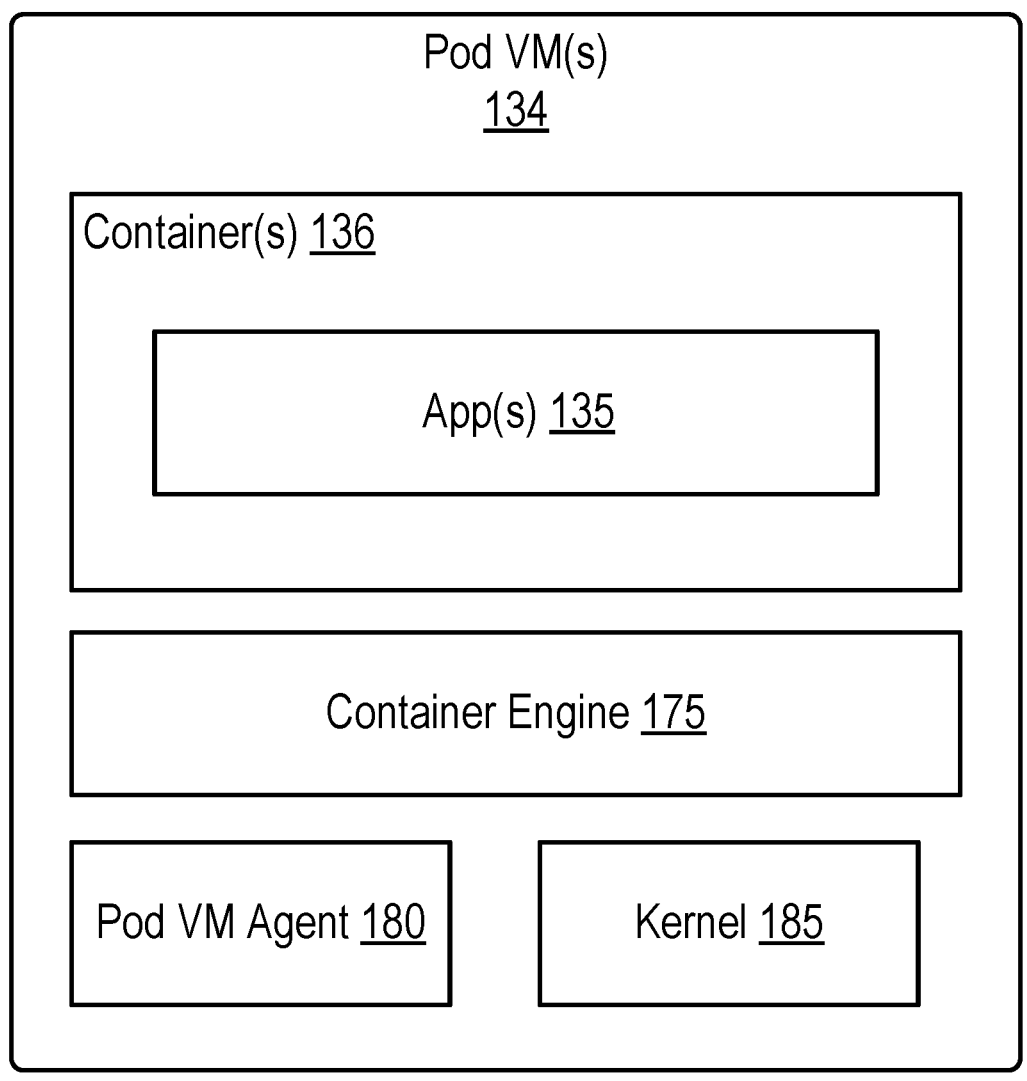
FIG. 1A is a block diagram of a pod VM, according to one or more embodiments.

Virtualization manager 108 can enable a host cluster as a supervisor cluster and provide its functionality to development teams. In the example of FIG. 1, host cluster 120 is enabled as a "supervisor cluster," described further herein, and thus VMs executing on each host 130 include pod VMs 134 and native VMs 132. A "supervisor cluster" uses VMs to implement both control plane nodes having a Kubernetes control plane, and compute nodes managed by the control plane nodes. A pod VM 134 is a VM that includes a kernel and a container engine that supports execution of containers 136, as well as an agent (referred to as a pod VM agent) that cooperates with a controller of an orchestration control plane executing in hypervisor 140 (referred to as a pod VM controller). FIG. 1A is a block diagram of a pod VM 134, according to one or more embodiments. Each pod VM 134 has one or more containers 136 running therein in an execution space managed by container engine 175. The lifecycle, of containers 136 is managed by pod VM agent 180. Both container engine 175 and pod VM agent 180 execute on top of a kernel 185 (e.g., a Linux® kernel).

Native VMs 132 and pod VMs 134 support applications 133, 135 deployed onto host cluster 120, which can include containerized applications 133 and 135, executing in pod VMs 134 and native VMs 132, and applications executing directly on guest OSs (non-containerized) (e.g., executing in native VMs 132). Support VMs 138 have specific functions within host cluster 120. For example, support VMs 138 can provide control plane functions, edge transport functions, and/or the like.

In an embodiment, data center 102 further includes an image registry 103. Image registry 103 manages images and image repositories for use in supplying images for containerized applications. Containers of supervisor host cluster 120 may execute in pod VMs 134. The containers in pod VMs 134 are spun up from container images managed by image registry 103.

In Kubernetes, a host cluster 120 may be a supervisor host cluster 120, hosts 130 become nodes of a Kubernetes cluster, and pod VMs 134 executing on hosts 130 implement Kubernetes pods. The orchestration control plane includes container orchestrator 110 and agents 142 (e.g., installed by virtualization manager 108 and/or network manager 106 in hypervisor 140 to add host 130 as a managed entity). Container orchestrator 110 may be a supervisor Kubernetes master and includes control plane components of Kubernetes, as well as custom controllers, custom plugins, scheduler extender, and the like that extend Kubernetes to interface with virtualization manager 108 and the virtualization layer. For purposes of clarity, container orchestrator 110 is shown as a separate logical, entity. For practical implementations, container orchestrator 110 may be implemented as one or more native VM(s) 132 and/or pod VMs 134 in host cluster 120. Further, although only one container orchestrator 110 is shown, data center 102 can include more than one container orchestrator 110 in a logical cluster for redundancy and load balancing.

Data center 102 further includes container orchestrator client 109, CO client 109 provides an input interface for a user to container orchestrator 110. One example of a CO client 109 for Kubernetes is referred to as kubectl, Through CO client 109, the user can submit desired states of the Kubernetes system to CO 110, For example, kubectl can be used to deploy applications, inspect and manage cluster resources, and view logs. In embodiments, the user submits the desired states within the scope of a supervisor namespace. In Kubernetes, namespaces provide a scope for names of resources. Names of resources for namespaced objects (e.g., Deployments, Services) are unique within a namespace. Kubernetes starts with four initial names: default (default namespace for object with no other namespace3); kube-system (the namespace for objects created by the Kubernetes system); kube-public (a namespace readable by all users); and kube-node-lease (the namespace that holds lease objects associated with each node, where the lease allows sending of heartbeats to detect node failure). Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure, User-access constraints include definitions of users, roles, permissions, bindings of roles to users, and the like. Each supervisor namespace is expressed within the orchestration control plane using a namespace native to the orchestration control plane (e.g., a Kubernetes namespace or generally a "native namespace"), which allows users to deploy applications in supervisor host cluster 120 within the scope of supervisor namespaces. In this manner, the user interacts with CO 110 to deploy applications in supervisor host cluster 120 within defined supervisor namespaces.

Figure 2:
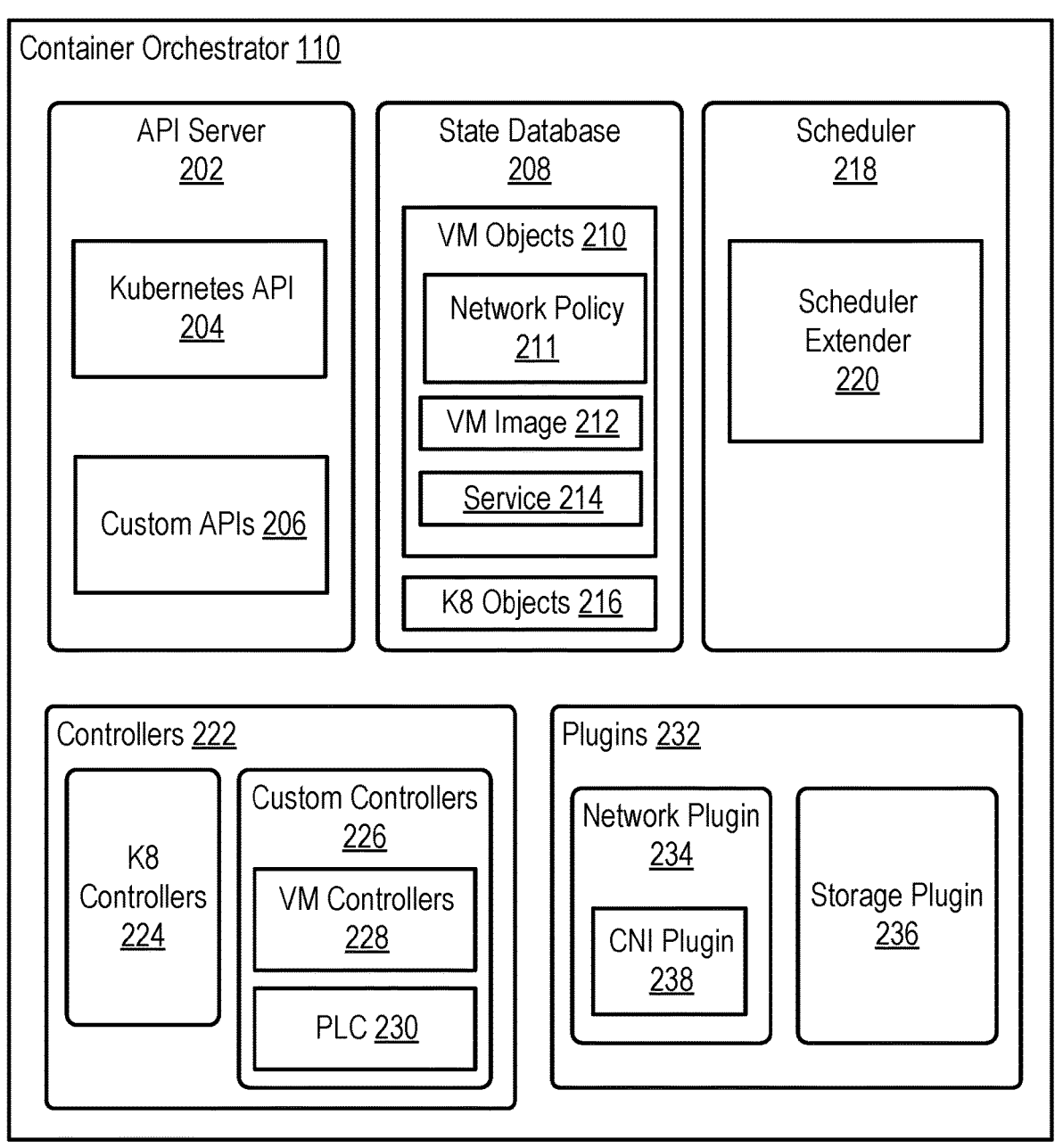
FIG. 2 is a block diagram of a container orchestrator, according to one or more embodiments.

FIG. 2 is a block diagram of container orchestrator 110 (e.g., a supervisor Kubernetes master) according to an embodiment. As shown, CO 110 includes application programming interface (API) server 202, a state database 208, a scheduler 218, controllers 222, and plugins 232.

API server 202 includes Kubernetes API 204 and custom API 206. Custom APIs 206 are API extensions of Kubernetes API 204 using either a custom resource/operator extension pattern or the API extension server pattern. Custom APIs 206 are used to create and manage custom resources, such as VM objects. API server 202 allows a user or administrator to provide a declarative schema for creating, updating, deleting, and viewing objects. A declarative schema allows developers to declare a final desired state of a database and the system adjusts automatically to the declarative schema.

State database 208 stores information about the state of supervisor host duster 120 as information about the objects created by API server 202. A user can provide application specification data, to API server 202, the application specification data defining various objects supported by the API. The objects have specifications that represent the desired state. State database 208 stores the information about objects defined by application specification data as part of the supervisor cluster state. Standard Kubernetes objects 216 include namespaces, nodes, pods, configuration maps, and secrets, among others. Custom objects are resources defined through custom APIs 206 (e.g., VM objects 210). Namespaces provide scope for objects. Namespaces are objects themselves maintained in state database 208. A namespace can include resource quotas, limit ranges, role bindings, and/or the like that are applied to objects declared within its scope. Virtualization manager 108 and network manager 106 create and manage supervisor namespaces for supervisor host cluster 120. A supervisor namespace is a resource-constrained and authorization-constrained unit of multi-tenancy managed by virtualization manager 108. Namespaces inherit constraints from corresponding supervisor cluster namespaces. Config maps include configuration information for applications managed by CO 110. Secrets include sensitive information for use by applications managed by CO 110 passwords, keys, tokens, etc.).

Controllers 222 can include, for example, standard Kubernetes controllers (e.g., K8 controllers 224) and/or custom controllers 226. Custom controllers 226 include controllers for managing lifecycles of Kubernetes objects 216 and custom objects. For example, custom controllers 226 can include VM controllers 228 configured to manage VM objects 210 and a pod VM lifecycle con tram (PLC) 230 configured to manage pods. Controllers 222 tracks objects in state database 208 of at least one resource type. Custom controller(s) 226 are responsible for making the current state of supervisor host cluster 120 come closer to the desired state as stored in state database 208. A custom controller 226 can carry out action(s) by itself, send messages to API server 202 to have side effects, and/or interact with external systems.

Plugins 232 can include, for example, network plugin 234 and storage plugin 236. Plugins 232 provide a well-defined interface to replace a set of functionality of the Kubernetes control plane. Network plugin 234 is responsible for configuration of the network layer to deploy and configure the cluster network. Network plugin 234 cooperates with virtualization manager 108 and/or network manager 106 to deploy logical network services of the cluster network. Network plugin 234 also monitors state database for VM objects 210. Storage plugin 236 is responsible for providing a standardized interface for persistent storage lifecycle, and management to satisfy the needs of resources requiring persistent storage. Storage plugin 236 cooperates with virtualization manager 108 to implement the appropriate persistent storage volumes in a shared storage.

Scheduler 218 monitors state database 208 for newly created pods with no assigned node. A pod is an object supported by API server 202 that is a group of one or more containers, with network and storage, and a specification on how to execute. Scheduler 218 selects candidate nodes in supervisor host cluster 120 for pods. Scheduler 218 cooperates with scheduler extender 220, which interfaces with virtualization management server 116. Scheduler extender 306 cooperates with virtualization manager 108 to select nodes from candidate sets of nodes and provide identities of hosts 130 corresponding to the selected nodes. For each pod, scheduler 218 also converts the pod specification to a pod VM specification, and scheduler extender 220 asks virtualization manager 108 to reserve a pod VM on the selected host 130.

Scheduler 218 updates pods in state database 208 with host identifiers. Kubernetes API 204, state database 208, scheduler 218, and Kubernetes controllers 224 comprise standard components of a Kubernetes system executing on supervisor host cluster 120.

Custom controllers 226, plugins 232, and scheduler extender 220 comprise custom components of CO 110 that integrate the Kubernetes system with host cluster 120 and virtualization manager 108.

Custom APIs 206 enable developers to discover available content and to import existing VMs as new images within their Kubernetes Namespace. VM objects 210 that can be specified through custom APIs 206 include VM resources, VM image resources 212, VM profile resources, network policy resources 211, network resources, and service resources 214.

VM image resource 212 enables discovery of available images for consumption via custom APIs 206. VM image resource 212 resource exposes verbs such as image listing, filtering and import so that the developer can manage the lifecycle and consumption of images. A single VM image resource 212 describes a reference to an existing VM template image in a repository.

A VM profile resource (not shown) is a resource that describes a curated set of VM attributes that can be used to instantiate native VMs. A VM profile resource gives the virtualization manager 108 administrator control over the configuration and policy of the native VMs that are available to the developer. The administrator can define a set of available VM profile resources available in each namespace. The administrator can create new profiles to balance the requirements of the administrator, the developer and those imposed by the underlying hardware. A VM profile resource enables definition of classes of information such as virtual CPU and memory capacity exposed to the native VM, resource, availability and compute policy for the native VM, and special hardware resources (e.g. FPGA, proem, vGPU, etc.) available to the VM profile.

A network resource (not shown) represents a single network to be consumed by a native VM. In embodiments, a network resource is a simple resource, abstracting the details of an underlying virtual port group that the network represents. For example, a network resource may be one of the following types: standard port group, distributed port group, or tier 1 logical router in the network layer, and/or the like. The available networks are configured by the administrator for each namespace via a network policy resource 211, Network resources are used to attach additional network interfaces to a specific virtual network.

Service resource 214 binds native VM instances to Kubernetes services in order to expose a network service from a native VM 132 to pod VMs 134 and other native VMs 132. In embodiments, service resource 214 includes a label selector that is used to match any labels applied to any VM resource. Once a service resource 214 and a. VM resource have been coupled, a delegate service and endpoints resource is installed in order to enable network access to the native VM 132 via the service DNS name or IP address.

A VM resource (not shown) may combine all of the above resources to generate a desired native VM 132. In embodiments, a VM resource specifies a VM image resource 212 to use as the master image. VM resources specify a configuration that is mapped to underlying infrastructure features by VM controllers 228, including but not limited to: VM Name, Virtual Resource Capacity, Network to Virtual NIC binding, DNS Configuration, Volume Customization, VM Customization scripts and VM Placement and Affinity policy.

Figure 3:
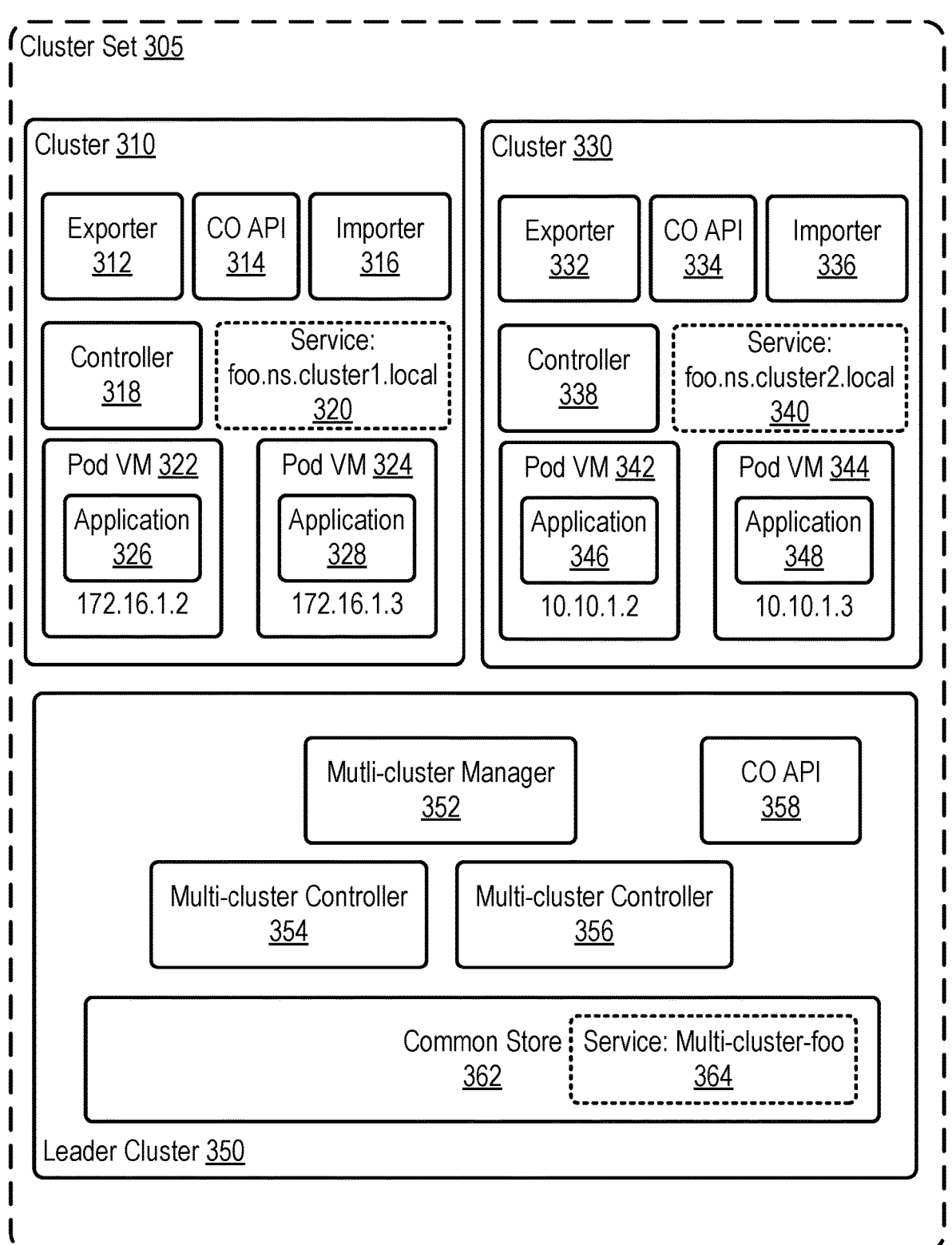
FIG. 3 depicts a block diagram of a cluster set configured for cross-cluster resource discovery and sharing, according to one or more embodiments.
Figure 4:
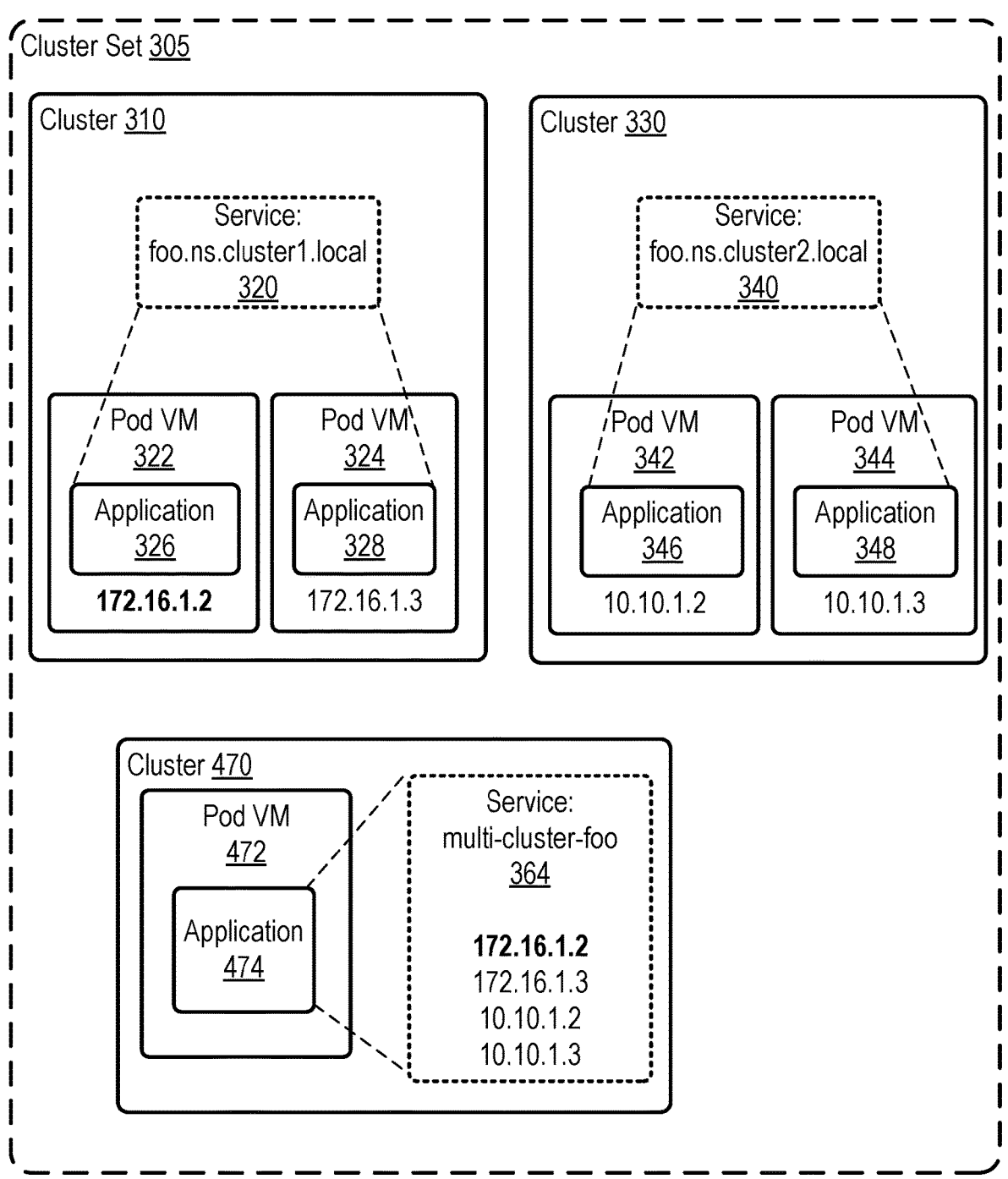
FIG. 4 depicts a block diagram of a cluster set configured for rack-aware pod selection for a multi-cluster object, according to one or more embodiments.

As discussed in more detail herein with respect to FIGS. 3-5, in a multi-duster environment, resources can be discovered across member clusters in a cluster set with the cross-cluster discovery described herein.

Kubernetes may use a Container Network Interface (CNI) to provide networking functionality to containers. Kubernetes may support various networking options via CNI plugins 238. The CNI plugins may enable Kubernetes to add a container to the network, delete a container from the network, and check whether the container's network is as expected. Kubernetes may select a target pod VM 134 for a service. Once the target pod VM 134 is selected, the networking is facilitated by the CM plugin. As discussed in more detail herein with respect to FIGS. 3-5, the target pod VM may be selected based on rack-awareness and may be in a different cluster than the application trying to access the service.

Enforcement of network policy may be dependent on the choice of plugin. For example, some plugins do not enforce network policy, in which adding network policy objects to the cluster will have no impact. Other plugins, however, do enforce network policy. Network policy may be set for both ingress traffic to pod VMs 134 and egress traffic from pod VMs 134. Some plugins offer extended APIs through CRDs. As discussed in more detail herein with respect to FIGS. 3-5, in a multi-cluster environment, the network policy may be enforced across multiple member clusters in a cluster set by the cross-cluster resource discovery described herein.

FIG. 3 depicts a block diagram of a cluster set 305 configured for resource sharing and discovery across multiple clusters, according to one or more embodiments. As shown, the cluster set 305 includes a group of clusters including cluster 310, cluster 330, and cluster 350. Although three clusters are shown in cluster set 305, it should be understood that a cluster set may include fewer or more than three clusters. Further, it should be understood that a multi-cluster environment may include multiple cluster sets, each cluster set including members clusters and a cluster leader.

In certain embodiments, each of the member clusters 310 and 330 within cluster set 305 can discover and share (e.g., import and export) resources with each of the other member clusters within the cluster set 305. Each member cluster 310 and 330 of the cluster set 305 can export its resources by writing objects to a common store in the leader cluster 350. The leader cluster 350 can monitor the objects shared by the member clusters in the cluster set 305 and create multi-cluster objects for objects in the common store in a same namespace. Each of the member clusters 310 and 330 in the cluster set 305 monitor (e.g., check or listen to) the common store at the leader cluster 350 to learn what resources have been exported by the other member clusters in the cluster set 305 and multi-cluster objects created by the leader cluster 350. Each of the member clusters 310 and 330 can import the objects from the common store and create a local copy of the objects.

A user or administrator may configure the member clusters 310 and 330 with resources. In the example illustrated in FIG. 3, the service 'foo' is created (e.g., in a ServiceExports object) in a namespace 'ns' in each of the member clusters 310 and 330. The resource may be associated with one or more endpoints in the member cluster, such as a VIM or container. As shown, member cluster 310 is configured with the service 320 (foo.ns.cluster1.local) running on containerized application 326 on pod VM 322 and on containerized application 328 on pod VM 324. Cluster 330 is configured with the service 340 (foo.ns.cluster2.1.local) running on containerized application 346 on pod VM 342 and containerized application 348 on pod VM 344. In some embodiments, cluster 310 is configured via the CO API 314 and cluster 330 is configured via the CO API 334.

Each of the member clusters 310 and 330 May announce the configured resources so they can be discovered by the other member clusters of the cluster set 305. In the example illustrated in FIG. 3, exporters 312 and 332 in the member clusters 310 and 330, respectively, see the configured ServiceExports object with the service 'foo'. The exporters 312 and 332 collect the associated resources, services, and endpoints, associated with the object. For example, exporter

312 of cluster 310 collects the service 'foo', the namespace 'ns', and the associated endpoints pod VM 322 (172.16.1.2) and pod VM 324 (172.161.3). Exporter 332 of cluster 330 collects the service 'foo', the namespace 'ns', and the associated endpoints pod VM 342 (10.10.1.2) and pod VM 348 (10.10.1.3).

It is noted that in FIG. 3, exporter 312, importer 316, and controller 318 (and similarly, exporter 332 importer 336, and controller 338) are shown separately, however, in certain embodiments, exporter 312, importer 316, and controller 318 may be implemented as a single controller. For example, exporter 312, importer 316, and controller 318 may be implemented as a CNI controller.

The exporters 312 and 332 in each of the member clusters 310 and 330, respectively, announces the collected resources, services, and endpoints associated with the configured object (or objects) to the leader cluster 350. In certain embodiments, the collected information is first wrapped in an object wrapper (e.g., ResourceExports object wrapper) and then provided to the leader cluster 350. In certain embodiments, the wrapped object wrapper is written to a common store at the leader cluster 350. In the example illustrated in FIG. 3, exporter 312 wraps the collected services (foo.ns.cluster1.f) and associated endpoints (172.16.1.2, 172.161.3) in the ResourceExports object wrapper and writes the ResourceExports object wrapper to common store 362 of leader cluster 350. Common store 362 may be a custom definition store. In some embodiments, common store 362 is accessible by any of the member clusters in cluster set 305. Exporter 332 wraps the collected services (foo.ns.cluster2.local) and associated endpoints (10.10.1.2, and 10.10.1.3) in the ResourceExports object wrapper and writes the ResourceExports object wrapper to common store 362 of leader cluster 350.

Leader cluster 350 may include one or more multi-cluster controllers. In the example illustrated in FIG. 3, leader cluster 350 includes multi-cluster controller 354 and multi-cluster controller 356. In some embodiments, multi-cluster controller 354 and multi-cluster controller 356 implement a CNI controller. In certain embodiments, multi-cluster controller 354 is configured to monitor common store 362 for objects exported by members clusters and written to common store 362, In certain embodiments, multi-cluster controller 354 is configured to decapsulate the ResourceExports object wrapper to obtain the original resources (e.g., the service 'foo') and the associated endpoints. In certain embodiments, multi-cluster controller 354 filters the resources and forwards the filtered resources to multi-cluster manager 352. In some embodiments, the filtering includes identifying resources associated with a same namespace.

Multi-cluster manager 352 is configured to receive the resources and the associated endpoints, create multi-cluster objects, and provide the multi-cluster objects to multi-cluster manager 252. In certain embodiments, multi-cluster manager 352 receives the filtered resources from multi-cluster controller 354. The multi-cluster controller 354 receives resources exported from multiple member clusters including resources with a same namespace and associated with endpoints in the multiple member clusters. Multi-cluster manager 352 is configured to compute a multi-cluster object from the resources in the same namespace associated with the multiple endpoints. In the example illustrated in FIG. 3, multi-cluster manager 352 determines the multi-cluster service 'multi-cluster foo' 364 and the associated endpoints 172.16.1.2, 172.161.3, 10.10.1.2, and 10.10.1.3.

Multi-cluster manager 352 forwards the multi-cluster object (or objects) and the associated endpoints to multi-cluster controller 356. Multi-cluster controller 356 is con-figured to obtain multi-cluster objects from multi-cluster manager 352 and add the multi-cluster objects to common store 362. In certain embodiments, multi-cluster manager 352 wraps the multi-cluster objects and the associated endpoints in an object wrapper (e.g., ResourceImport) and writes the ResourceImport object wrapper to common store 362.

Each of the importers 316 and 336 in member clusters 310 and 330, respectively, monitor common store 362 for multi-cluster objects. In certain embodiments, the importers 316 and 336 in member clusters 310 and 330, respectively, decapsulate the ResourceImports wrapped object to obtain the multi-cluster objects and the associated endpoints. In certain embodiments, the importers 316 and 336 in member clusters 310 and 330, respectively, filter the resources and create a local copy of the filtered resource. In some embodiments, importers 316 and 336 forward the multi-cluster objects and associated endpoints to CO API 314 and CO API 334, respectively, for example, via controllers 318 and 338 respectively.

While FIG. 3 is described with respect to discovery and sharing of a service resource ('foo'), the multi-cluster object discovery and sharing may be used for other types of multi-cluster objects, including CRD resources, such as for network policy control. For example, an administrator can configure leader cluster 350 with a network policy resource that can be shared to the member clusters 310 and 330. The network policy may control ingress and egress of contain-erized application traffic across member clusters. For egress, an administrator can define and select a multi-cluster service as the target in the network policy. For ingress, the network policy in each member cluster can be defined based on the local copy of the discovered resources to allow or deny access.

In addition, the multi-cluster object discovery and sharing may enable rack-aware service routing in a multi-cluster environment. The controllers (e.g., CNIs) of member clus-ters perform multi-cluster object discovery and sharing. FIG. 4 depicts a block diagram of the cluster set 305 configured for rack-aware pod selection for a multi-cluster object, according to one or more embodiments. It is noted that in FIG. 4, certain elements of the cluster set 305 and certain components of the member clusters are not shown, for simplicity.

As shown, the cluster set 305 may further include member cluster 470. In the example illustrated in FIG. 4, member cluster 470 includes a local copy of multi-cluster-foo 364, for example, imported from common store 362, and the associated endpoints 172.16.1.2, 172.161.3, 10.101.2, and 10.10.1.3 in member clusters 310 and 330. In certain embodiments, member cluster 470 further has rack infor-mation for the endpoints. For example, the rack information may be obtained from the other member clusters 310 and 330. Accordingly, when application 474 running on pod VM 472 in member cluster 470 tries to access 'multi-cluster-foo', the application 474, for example, via a controller of member cluster 470 (e.g., a cni-agent), checks which rack the pod VM 472 running the application 474 is running on. The endpoint associated with 'multi-cluster-foo' 364 that is running on the same rack or a rack in a nearby location to the rack the application 474 is running is selected. For example, pod VM 472 may run on a rack in Dallas, TX, and pod VM 322 also runs on a rack in Dallas. In this case, pod VM 322 is selected as the endpoint (172.16.1.2) to run 'multi-cluster-foo' 364 for application 474. With rack-awareness, multi-cluster service communication can be more efficient with lower latency.

FIG. 5 depicts an example call flow illustrating operations 500 for cross-cluster service resource discovery, according to one or more embodiments. Operations 500 may be performed by a leader cluster (e.g., leader cluster 350) of a cluster set (e.g., cluster set 305).

Operations 500 may begin, at 502, by obtaining, at a common store (e.g., common store 362) in a first node cluster (e.g., leader cluster 350) in a cluster set, from a second node cluster (e.g., cluster 310) in the cluster set, information about a service resource (e.g., 'foo.ns.cluster1.local' 320) of the second node cluster. The cluster set comprises a plurality of node clusters including the first node cluster, the second node cluster, and a third node cluster (e.g., cluster 330). Each node cluster of the plurality of node clusters includes one or more nodes running one or more containerized applications. The com-mon store is accessible to the plurality of node clusters. The service resource is associated with a namespace (e.g., 'ns').

Operations 500 include, at 504, creating a multi-cluster object (e.g., 'multi-cluster-foo' 364) associated with the service resource. The multi-cluster object provides an asso-ciation between the service resource and one or more endpoints (e.g., pod VM 322 and pod VM 324) on the second node cluster.

Operations 500 include, at 506, storing the multi-cluster object in the common store. The multi-cluster object is accessible in the common store by any of the plurality of clusters in the cluster set to access the service resource on any of the one or more endpoints on the second node cluster.

In some embodiments, operations 500 may further include obtaining, at the common store in the first node cluster, from at least one of: the third node cluster or a fourth node cluster, information about a service resource (e.g., 'foo.ns.cluster2.local' 340) of the third node cluster or the fourth node cluster. The service resource of the third or fourth node cluster is associated with the namespace (e.g., 'ns'). The multi-cluster object is further associated with the service resource of the third or fourth node cluster. The multi-cluster object (e.g., 'multi-cluster-foo' 364) further provides an association between the service resource and one or more endpoints (e.g., pod VM 342 and pod VM 344) on the third or fourth node cluster.

In some embodiments, operations 500 may include obtaining, by a node cluster of the plurality of node clusters, the multi-cluster object from the common store. Operations 500 may include selecting, by the node cluster, an endpoint of the one or more endpoints on the second node cluster or an endpoint of the one or more endpoints on the third or fourth node cluster, to access the service resource.

In some embodiments, the selection of the endpoint is based on a location of a physical host server running the cluster and a location of a physical host server running the endpoint.

In some embodiments, obtaining, at the common store in the first node cluster, from the second node cluster in the cluster set, the information about the service resource of the second node cluster, at 502, comprises obtaining a wrapped object (e.g., ResourceExports) comprising the information about the service resource of the second node cluster and decapsulating the wrapped object to obtain the information about the service resource of the second node cluster.

In some embodiments, the information about the service resource of the second node cluster indicates the namespace and the one or more endpoints on the second node cluster.

In some embodiments, the service resource comprises a Kubernetes service resource associated with a set of the containerized applications or a network policy.

In some embodiments, operations 500 include wrapping the multi-cluster object. In some embodiments, storing the multi-cluster object in the common store, at 506, comprises storing the wrapped multi-cluster object (e.g., ResourceImports) in the common store.

The embodiments described herein provide a technical solution to a technical problem associated with configuration of advanced networking. More specifically, implementing the embodiments herein allows for efficient cross-cluster service resource discovery and sharing. The cross-cluster service resource discovery and sharing may allow rack-aware selection of endpoints for service resources. The cross-cluster service resource discovery and sharing may be used to efficiently enforce a network policy in a multi-cluster environment.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for cross-cluster service resource discovery, the method comprising:

obtaining, at a common store in a first node cluster in a cluster set, from an exporter in a cluster controller of a second node cluster in the cluster set, information about a service resource of the second node cluster, wherein the cluster set comprises a plurality of node clusters including the first node cluster, the second node cluster, and a third node cluster, wherein the common store is accessible to the plurality of node clusters, wherein each node cluster of the plurality of node clusters includes one or more nodes running one or more containerized applications, and wherein the service resource is associated with a namespace;

creating a multi-cluster object associated with the service resource, wherein the multi-cluster object provides an association between the service resource and one or more endpoints on the second node cluster; and storing the multi-cluster object in the common store, wherein the multi-cluster object is accessible in the common store by any of the plurality of node clusters in the cluster set to access the service resource on any of the one or more endpoints on the second node cluster; and accessing, by one of the plurality of clusters, the multi-cluster object.

2. The method of claim 1, wherein accessing the multi-cluster object comprises:

obtaining, at the common store in the first node cluster, from at least one of: the third node cluster or a fourth node cluster, information about a service resource of the third node cluster or the fourth node cluster, wherein:

the service resource of the third or fourth node cluster is associated with the namespace;

the multi-cluster object is further associated with the service resource of the third or fourth node cluster; and the multi-cluster object further provides an association between the service resource and one or more endpoints on the third or fourth node cluster.

3. The method of claim 2, further comprising:

obtaining, by a node cluster of the plurality of node clusters, the multi-cluster object from the common store; and selecting, by the node cluster, an endpoint of the one or more endpoints on the second node cluster or an endpoint of the one or more endpoints on the third or fourth node cluster, to access the service resource.

4. The method of claim 1, wherein a multi-cluster manager creates the multi-cluster object and a multi-cluster controller stores the multi-cluster object.

5. The method of claim 1, wherein obtaining, at the common store in the first node cluster, from the second node cluster in the cluster set, the information about the service resource of the second node cluster comprises:

obtaining a wrapped object comprising the information about the service resource of the second node cluster; and decapsulating the wrapped object to obtain the information about the service resource of the second node cluster.

6. The method of claim 1, wherein the first node cluster comprises a first plurality of nodes, the first plurality of nodes comprising a first node that is a first virtual machine (VM) running a first containerized application; and the first VM is supported by a first virtualization layer that abstracts that abstracts processor, memory, storage, and networking resources of a hardware platform of a first host computer.

7. The method of claim 1, wherein the service resource comprises a Kubernetes service resource associated with a set of the containerized applications or a network policy.

8. The method of claim 1, further comprising:

wrapping the multi-cluster object, wherein storing the multi-cluster object in the common store comprises storing the wrapped multi-cluster object in the common store.

9. A system comprising:

one or more processors; and at least one memory, the one or more processors and the at least one memory configured to:

obtain, at a common store in a first node cluster in a cluster set, from an exporter in a cluster controller of a second node cluster in the cluster set, information about a service resource of the second node cluster, wherein the cluster set comprises a plurality of node clusters including the first node cluster, the second node cluster, and a third node cluster, wherein the common store is accessible to the plurality of node clusters, wherein each node cluster of the plurality of node clusters includes one or more nodes running one or more containerized applications, and wherein the service resource is associated with a namespace;

create a multi-cluster object associated with the service resource, wherein the multi-cluster object provides an association between the service resource and one or more endpoints on the second node cluster; and store the multi-cluster object in the common store, wherein the multi-cluster object is accessible in the common store by any of the plurality of node clusters in the cluster set to access the service resource on any of the one or more endpoints on the second node cluster; and access, by one of the plurality of clusters, the multi-cluster object.

10. The system of claim 9, wherein to access the multi-cluster object comprises to:

obtain, at the common store in the first node cluster, from at least one of: the third node cluster or a fourth node cluster, information about a service resource of the third node cluster or the fourth node cluster, wherein:

the service resource of the third or fourth node cluster is associated with the namespace;

the multi-cluster object is further associated with the service resource of the third or fourth node cluster; and the multi-cluster object further provides an association between the service resource and one or more endpoints on the third or fourth node cluster.

11. The system of claim 10, the one or more processors and the at least one memory configured to:

obtain, by a node cluster of the plurality of node clusters, the multi-cluster object from the common store; and select, by the node cluster, an endpoint of the one or more endpoints on the second node cluster or an endpoint of the one or more endpoints on the third or fourth node cluster, to access the service resource.

12. The system of claim 11, wherein the selecting of the endpoint is based on a location of a physical host server running the cluster and a location of a physical host server running the endpoint.

13. The system of claim 9, wherein obtaining, at the common store in the first node cluster, from the second node cluster in the cluster set, the information about the service resource of the second node cluster comprises:

obtaining a wrapped object comprising the information about the service resource of the second node cluster; and decapsulating the wrapped object to obtain the information about the service resource of the second node cluster.

14. The system of claim 9, wherein the information about the service resource of the second node cluster indicates the namespace and the one or more endpoints on the second node cluster.

15. The system of claim 9, wherein the service resource comprises a Kubernetes service resource associated with a set of the containerized applications or a network policy.

16. The system of claim 9, the one or more processors and the at least one memory configured to:

wrap the multi-cluster object, wherein store the multi-cluster object in the common store comprises storing the wrapped multi-cluster object in the common store.

17. A non-transitory computer-readable medium comprising instructions that, when executed by one or more processors of a computing system, cause the computing system to perform operations for cross-cluster service resource discovery, the operations comprising:

obtaining, at a common store in a first node cluster in a cluster set, from an exporter in a cluster controller of a second node cluster in the cluster set, information about a service resource of the second node cluster, wherein the cluster set comprises a plurality of node clusters including the first node cluster, the second node cluster, and a third node cluster, wherein the common store is accessible to the plurality of node clusters, wherein each node cluster of the plurality of node clusters includes one or more nodes running one or more containerized applications, and wherein the service resource is associated with a namespace;

creating a multi-cluster object associated with the service resource, wherein the multi-cluster object provides an association between the service resource and one or more endpoints on the second node cluster;

storing the multi-cluster object in the common store, wherein the multi-cluster object is accessible in the common store by any of the plurality of node clusters in the cluster set to access the service resource on any of the one or more endpoints on the second node cluster and accessing, by one of the plurality of clusters, the multi-cluster object.

18. The non-transitory computer-readable medium of claim 17, wherein accessing the multi-cluster object comprises:

obtaining, at the common store in the first node cluster, from at least one of: the third node cluster or a fourth node cluster, information about a service resource of the third node cluster or the fourth node cluster, wherein:

the service resource of the third or fourth node cluster is associated with the namespace;

the multi-cluster object is further associated with the service resource of the third or fourth node cluster; and the multi-cluster object further provides an association between the service resource and one or more endpoints on the third or fourth node cluster.

19. The non-transitory computer-readable medium of claim 18, the operations further comprising:

obtaining, by a node cluster of the plurality of node clusters, the multi-cluster object from the common store; and selecting, by the node cluster, an endpoint of the one or more endpoints on the second node cluster or an endpoint of the one or more endpoints on the third or fourth node cluster, to access the service resource.

20. The non-transitory computer-readable medium of claim 19, wherein the selecting of the endpoint is based on a location of a physical host server running the cluster and a location of a physical host server running the endpoint.

* * * * *